United States Patent [19]

Otten

[11] Patent Number: 5,511,233
[45] Date of Patent: Apr. 23, 1996

[54] SYSTEM AND METHOD FOR MOBILE COMMUNICATIONS IN COEXISTENCE WITH ESTABLISHED COMMUNICATIONS SYSTEMS

[75] Inventor: David D. Otten, Redondo Beach, Calif.

[73] Assignee: Celsat America, Inc., Torrance, Calif.

[21] Appl. No.: 223,437

[22] Filed: Apr. 5, 1994

[51] Int. Cl.$^6$ ............................. H04B 1/00; H04B 7/00
[52] U.S. Cl. .................. 455/56.1; 455/33.1; 455/54.1; 455/63; 455/67.3
[58] Field of Search ..................... 455/12.1, 33.1, 455/33.2, 33.4, 54.1, 56.1, 63, 68, 34.1, 34.2, 62, 67.3, 67.5; 370/18; 375/1; 379/59, 63

[56] References Cited

U.S. PATENT DOCUMENTS

| | | | |
|---|---|---|---|
| 5,040,238 | 8/1991 | Comroe et al. | 455/33 |
| 5,073,900 | 12/1991 | Mallinckrodt | 375/1 |
| 5,142,691 | 8/1992 | Freeburg et al. | 455/38.2 |
| 5,247,701 | 9/1993 | Comroe et al. | 455/33.4 |
| 5,276,908 | 1/1994 | Koohgoli et al. | 455/34.1 |
| 5,365,451 | 11/1994 | Wang et al. | 364/449 |
| 5,410,737 | 4/1995 | Jones | 455/56.1 |

*Primary Examiner*—Reinhard J. Eisenzopf
*Assistant Examiner*—Marsha D. Banks-Harold
*Attorney, Agent, or Firm*—Drummond & Duckworth

[57] ABSTRACT

A mobile communications system provides communications with mobile users in the interference zones of communications services having priority of use of the frequency band in which the mobile user operates. The frequency band has been previously allocated for use by the other services, such as fixed microwave service (FMS); however, by means of the invention, the mobile user is able to conduct communications operations on a subband or subbands in that frequency band. A position locating system determines the position of the mobile user and if the user is within an interference zone, the mobile user is assigned subbands for operation in the previously allocated frequency band that are outside the subbands of operation of the FMS. A memory accessible by the processor selecting the frequency band of operation of the mobile user includes descriptions of the transmit and receive interference zones of each FMS. The processor selects the frequency subband of operation of the mobile user based on its position relative to the interference zone or zones. The system may have surface and/or space nodes and a network controller that monitors the mobile user's position and controls the nodes and user to subbands. Mobile users are isolated from the fixed microwave sites either by continuous management of their frequency assignments by calculations and commands sent from the network controller to the mobile user or by computations by the mobile user's unit. The mobile system is frequency agile by operating in dynamically selectable frequency subbands.

26 Claims, 9 Drawing Sheets

SYSTEM AND METHOD FOR MOBILE COMMUNICATIONS IN COEXISTENCE WITH ESTABLISHED COMMUNICATIONS SYSTEMS

BACKGROUND

The invention is related generally to mobile communications and more particularly to a system and method for operating in an area and in a frequency spectrum in which existing communication systems are already operating.

The mobile communications industry has grown at a fast pace in the United States and even faster in some other countries. It has become an important service of substantial utility and because of the growth rate, saturation of the existing service is of concern. Contributing to this concern is the congestion of the electromagnetic frequency spectrum which is becoming increasingly severe as the communications needs of society expand. This congestion is caused not only by fixed microwave service or site (FMS) installations but also by other communications systems including mobile communications systems. In the mobile communications industry alone, it is estimated that the number of world-wide mobile subscribers will increase by an order of magnitude in the next ten years. The radio frequency spectrum is limited and in view of this increasing demand for its use, means to use it more efficiently are constantly being explored.

Increasing demands for mobile radio service have put great strain on the frequency allocation process. This is particularly true for those frequencies currently felt to be uniquely usable for mobile radio; that is, the UHF band from roughly 300 to 3,000 Mhz. Much of this precious spectrum is presently allocated to fixed microwave service. In recognition of the particular value of these frequencies for mobile radio service, the Federal Communications Commission (FCC) has proposed plans for relocating some of the fixed microwave service users to other frequency bands to make room for emerging technologies and personal communications systems particularly in the mobile services. Relocation may be a lengthy process taking place over many years. In the meantime, new mobile services may be licensed on a "not-to-interfere" and "not-to-claim interference" basis with respect to the incumbents.

Detailed study of the geographic distribution of the present fixed microwave service licensees indicates that while in certain geographical areas these bands are almost fully allocated for use as fixed microwave services of a given type, there is still considerable usable frequency spectrum available in the geographical and frequency spaces between the interference zones of present fixed microwave service installations.

As used herein, an "interference zone" refers to a geographic region surrounding a system operating in the electromagnetic spectrum within which harmful interference would be encountered. Should the transmission by a second system interfere with the reception of a first system, the second system would be considered to be operating in the interference zone of the first system. Should the receiver of a second system receive harmful interference from the transmission of a first system, the second system would also be considered to be operating in the interference zone of the first system.

In a system that provides both transmission and reception, there are thus two interference zones and these two interference zones may differ. A "transmit interference zone" is a minimal geographical region about the fixed system's radio communication receiver system defined for a particular frequency band where transmission by a mobile transmitter system on that frequency band in that geographical region could cause harmful interference to the fixed system's receiver system. A "receive interference zone" is a minimal geographical region about a fixed system's radio communication transmitting system defined for a particular frequency band where a mobile receiver system in that frequency band within that geographical region could receive harmful interference from the fixed system's transmitting system. The interference zone is specified by frequency bands and by three dimensions of geography.

Geosynchronous communications satellites over the United States have shared frequency spectrum with fixed microwave service ground towers from the beginning of the commercial space age. Such coexistence is practical because the satellite-to-terrestrial microwave geometry is fixed at a range of about 22,000 nautical miles and at elevation angles greater than about 20 degrees. This provides an acceptably large minimum angle between a geostationary satellite and the fixed ground microwave system. When the ground fixed microwave system follows category "A" antenna requirements in accordance with FCC regulations, and the satellite appropriately limits its flux density on the ground, the two systems can operate on a mutually non-interfering basis. Even though the two systems use common frequencies, the satellite service is not in the interference zone of the ground tower systems and vice versa.

This compatible operation of geostationary satellite systems with terrestrial microwave stations in a common frequency band is facilitated by their fixed positions, the large distance between them, and the directivity of their antennas. Because the satellite system does not move relative to the FMS, it will never be in a geographically interfering position with the terrestrial microwave stations. Such is not the case with mobile users. Because mobile users are capable of continuously changing position and their antennas are not directive, their operation could interfere with an existing station. This arrangement would not provide a suitable "not-to-interfere" system with the existing licensees. However, as discussed above, there exists a large amount of frequency spectrum that is unused between the interference zones of the existing stations.

Hence those skilled in the art have recognized the need for a suitably agile, intelligent communications system having mobile radio users that can coexist with service installations operating in fully allocated frequency bands. Those skilled in the art have also recognized the need for a communications system for mobile users that can coexist on a not-to-interfere and not-to-claim interference basis with fixed microwave service. The present invention meets this need and others.

SUMMARY OF THE INVENTION

Briefly and in general terms, the invention is directed to a system and method for providing communications with mobile users in the interference zones of communications services having priority to the frequency band in which communications with the mobile users are desired. In one aspect of the invention, the mobile communication system includes a system that has the capability of retrieving from memory descriptions of the interference zones of communications services that have the priority. The mobile communication system is then directed to operate on a frequency in the allocated band other than that used by the communications service having priority to the band when within such an interference zone.

A mobile communication device used by the mobile user is responsive to a frequency command control signal to select the frequency subband at which it operates. The system further includes a memory in which is stored a description of the interference zone of the communications service. A position locating system adapted to determine the position of the mobile user provides a position signal and a processor adapted to receive the position signal, accesses the memory to retrieve the description of the interference zone of the communications service, compares the position of the mobile user to the interference zone and if the user is determined to be within the interference zone, provides a frequency control signal to the mobile user's communication device to select a frequency subband in the allocated frequency band other than the predetermined interfering frequency subband of the communications service.

In another aspect, the user's communication device comprises one or more of the position locating system, the memory, and/or the processor.

In a further detailed aspect of the invention, the mobile user's communication device comprises a delay circuit adapted to prevent transmission by the user's communication device until the processor has determined the position of the user and if the user's position is determined to be within the interference zone, to prevent transmission until the processor has provided the frequency control signal to select a frequency subband other than the predetermined frequency subband.

In another aspect, the communications system comprises a first communication node adapted to provide communication with the mobile communication device, the node providing the frequency control signal from the processor to the communication device of the mobile user. In a further feature, the system comprises a plurality of ground nodes adapted to communicate with the user's communication device and a ground node control center, with the ground node control center comprising the position locating system, the processor, and the memory, the ground node control center communicating the frequency control signal from the processor to the mobile communication device through a ground node.

The system comprises in a further feature one or more space nodes adapted to communicate with the user's communication device, and a space node control center, wherein the space node control center comprises the position locating system, the processor, and the memory, the space node control center communicating the frequency control signal from the processor to the mobile communication device through a space node. In a more detailed feature, the communications system comprises a plurality of ground nodes and space nodes, each node adapted to communicate with the user's communication device, and a control center, wherein the control center comprises the position locating system, the processor, and the memory, the control center communicating the frequency control signal from the processor to the mobile communication device through a node. In a more detailed aspect, a ground node control center is in communication with each of the ground nodes, a space node control center is in communication with each of the space nodes and the control center comprises a network control center that comprises the position locating system, the processor, and the memory, the network control center communicating the frequency control signal from the processor to the mobile communication device through a node control center and a node.

In more detailed aspects of the invention, the position locating system determines the geographic location of the mobile user through multi-lateration with a plurality of nodes. Additionally, at least one space node has a multiple beam antenna positioned so as to establish a first set of cells, each space node being capable of transmitting and receiving different predetermined sets of code division multiple access coded, spread spectrum waveforms, at least one surface node is positioned so to establish a second set of cells, each surface node being capable of transmitting and receiving the predetermined sets of code division multiple access coded, spread spectrum waveforms, and a network controller operationally connected with the space node and with the surface node to selectively allocate communications with the mobile user among the surface and space nodes and select the frequency of operation of the mobile user based on the frequency control signal.

In further aspects, the memory stores descriptions of the interference zones of a plurality of communications services, each of which operates in its own frequency subband. The processor is also adapted to access the memory to retrieve the descriptions of the interference zones of the communications services, compare the position of the mobile user to the retrieved interference zone descriptions and if the user is determined to be within an interference zone, provide a frequency control signal to the mobile user's communication device to select a frequency subband in the allocated frequency band other than the predetermined frequency subband of the communications service of the interference zone in which the mobile user is located.

In accordance with still more detailed aspects of the invention, a communications system provides communications with a mobile user in a frequency band allocated for use by communications services having fixed positions and having priority over use of the allocated frequency band, each communications service operating on a predetermined frequency subband in the allocated frequency band and each communications service having an interference zone, the communications system comprises a mobile communication device used by the mobile user, the communication device being responsive to a frequency control signal to select the frequency subband at which it operates, a plurality of ground nodes adapted to communicate with the user's communication device, a memory in which is stored a description of each of the interference zones of the communications services, a position locating system adapted to determine the position of the mobile user and provide a position signal, a processor adapted to receive the position signal, access the memory to retrieve the description of the interference zones of the communications services, compare the position of the mobile user to the interference zone descriptions and if the user is determined to be within an interference zone, provide a frequency control signal to the mobile user's communication device to select a frequency subband in the allocated frequency band other than the predetermined frequency subband of the communications service of the interference zone in which the mobile user is located, and a ground node control center, wherein the ground node control center comprises the position locating system, the processor, and the memory, the ground node control center communicating the frequency control signal from the processor to the mobile communication device through a ground node.

In yet further features in accordance with the invention, a communications system provides communications with a mobile user in a frequency band allocated for use by communications services having fixed positions and having priority over use of the allocated frequency band, each communications service operating on a predetermined frequency subband in the allocated frequency band and each communications service having an interference zone, the communications system comprises a mobile communication device used by the mobile user, the communication device being responsive to a frequency control signal to select the frequency subband at which it operates, a plurality of space nodes adapted to communicate with the user's communication device, a memory in which is stored descriptions of the interference zones of the communications services, a position locating system adapted to determine the position of the mobile user and provide a position signal, a processor adapted to receive the position signal, access the memory to retrieve the descriptions of the interference zones of the communications services, compare the position of the mobile user to the interference zones and if the user is determined to be within an interference zone, provide a frequency control signal to the mobile user's communication device to select a frequency in the allocated frequency band other than the predetermined frequency of the communications service of that interference zone, and a space node control center, wherein the space node control center comprises the position locating system, the processor, and the memory, the space node control center communicating the frequency control signal from the processor to the mobile communication device through a space node.

Other aspects and advantages of the invention will become apparent from a review of the drawings and the following detailed descriptions of preferred embodiments.

DETAILED DESCRIPTION OF PREFERRED EMBODIMENTS

Figure 1:
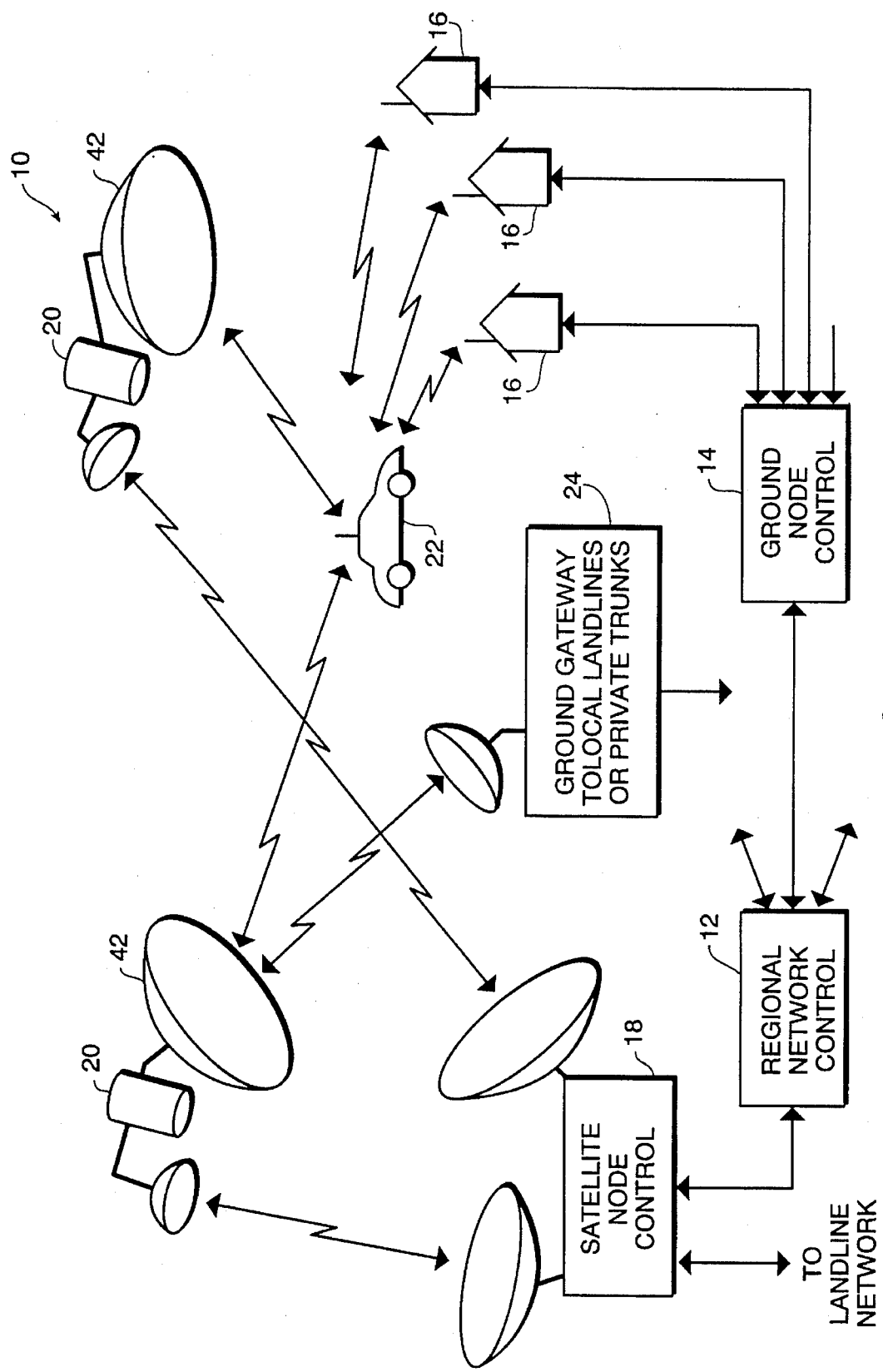
FIG. 1 presents a block diagram of a mobile communications system for operating in coexistence with other communications systems in a common frequency band, the system shown is a hybrid system having space and ground nodes with satellite and ground stations, respective node controls, and a regional network controller.

Referring now to the drawings in which like reference numerals indicate like or corresponding elements over the several views, there is shown in FIG. 1 an overview of a mobile communications system 10 showing the functional interrelationships of major elements. The regional network control center 12 directs the top level allocation of calls to satellite and ground regional resources throughout the region. The ground node control centers 14, one of which is shown, direct the allocation of calls to ground nodes within a major metropolitan region. The ground node 16 under direction of the respective ground node control center 14 receives calls over the fixed land line network, combines them into a composite signal, modulates that composite signal onto the transmission carrier, and broadcasts them over the region covered. Space node control center 18 also connected to the regional network control center 12 similarly handles calls designated for satellite links, encodes them, spreads them according to the unique spreading codes assigned to the designated users, and multiplexes them with other similarly directed calls into an uplink trunk that is beamed up to the designated satellite 20.

Space nodes 20 receive the uplink trunk, separate the calls intended for different satellite cells, direct each to its appropriate cell transmitter and cell beam, and broadcast the composite of all such similarly directed calls down to the intended satellite cellular area. Mobile user units 22 respond to signals of either space or ground node origin, receive any signal spread using the user's assigned unique spreading code, de-spread, de-modulate, and decode the information and deliver the call to the user. Gateways 24 provide direct trunks, that is, groups of channels, between satellite and the ground public switched telephone system or private trunk users. The space nodes 20 in one embodiment include multiple beam antennas 42 which establish a set of cells on the surface. In a further embodiment, the surface nodes 16 may also establish a set of cells on the surface.

All of the above-discussed centers, nodes, units and gateways operate with full duplex transmit/receive performing the corresponding inbound (user to system) link functions as well in the inverse manner to the outbound (system to user) link functions just described.

Figure 2:
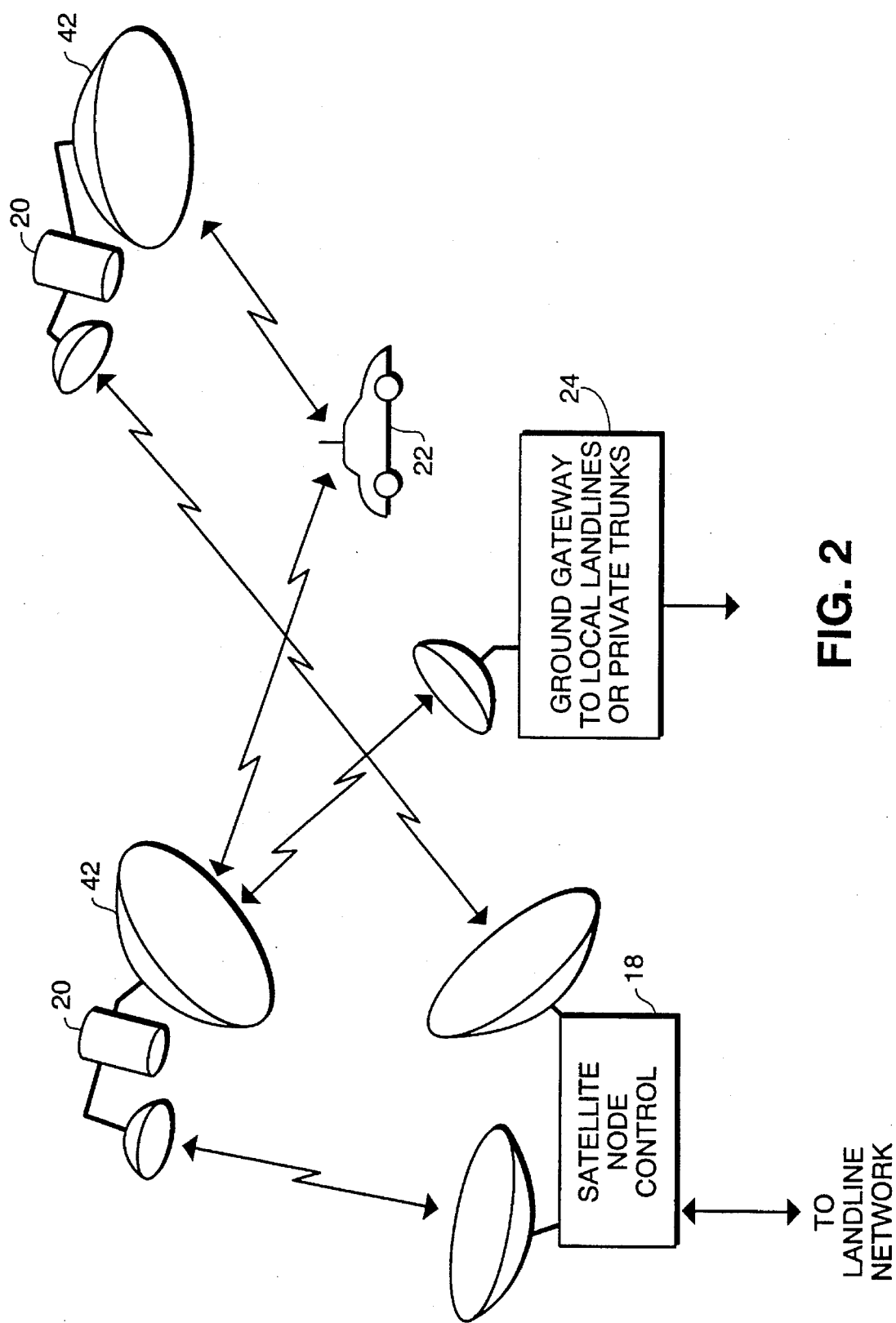
FIG. 2 is a block diagram of a mobile communications system for operating in coexistence with other communications systems in a common frequency band, the system shown has space nodes with a node controller.
Figure 3:
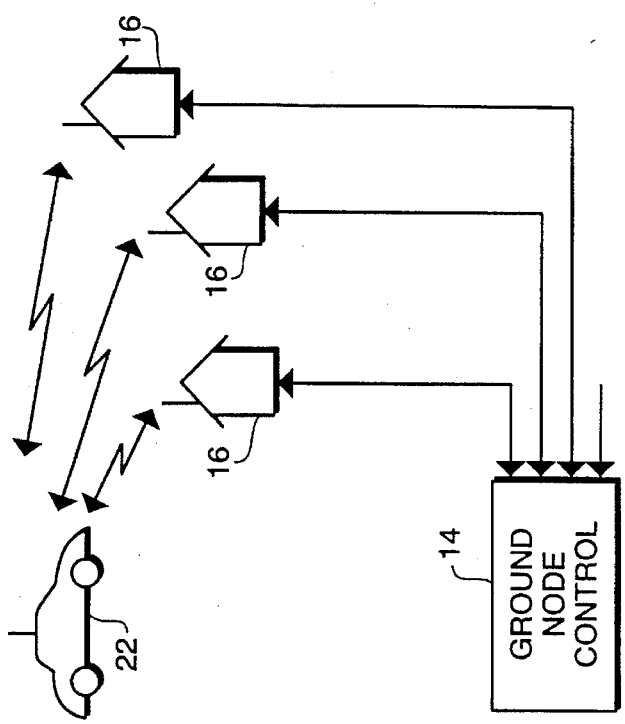
FIG. 3 is a block diagram of a mobile communications system for operating in coexistence with other communications systems in a common frequency band, the system shown has ground nodes with a node controller.

Although a hybrid system having a mixture of space and ground nodes is shown and described in detail herein, the principles of the invention are also applicable to different systems. For example, shown in FIG. 2 is a system having only space nodes 20 for communicating with the mobile user 22. The space node control center 18 controls both illustrated space nodes 20. FIG. 3 presents a system having only surface nodes 16 communicating with the mobile user 22. The ground node control center 14 controls the surface nodes 16.

The systems of FIGS. 1, 2, and 3 provide viable mobile communications systems and in accordance with the principles of the invention, can be used to provide mobile communications in the fully allocated frequency spectrum areas, in particular, in the fixed microwave service areas.

Figure 4:
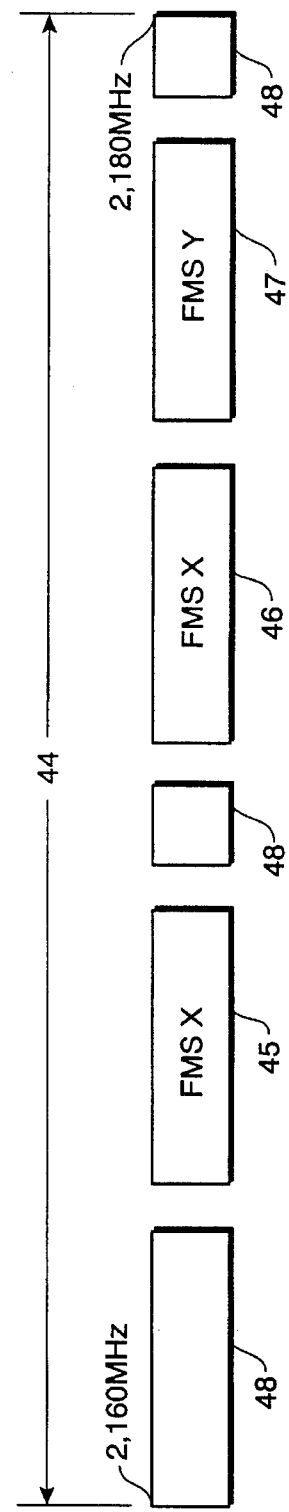
FIG. 4 is a diagram of a frequency band allocated for FMS use and showing subbands used by the FMS and by the mobile system in accordance with principles of the invention.

Turning now to FIG. 4, an example is shown. Included is an illustration of the 2160 to 2180 mHz frequency band 44 allocated to a fixed microwave service is shown. The FMS has priority to the entire band; however, as shown in this diagram, this particular FMS only uses the subbands indicated as FMS X 45 and 46. In this case, the first subband 45 is 0.8 mHz and the second 46 is 1.2 mHz for a total usage of 2.0 mHz in the band 44 by the FMS X. The mobile communications system in accordance with the invention would be aware of these occupied subbands. In the case where another or multiple FMS' are in the area, have overlapping antenna patterns, and additional subbands in the allocated band 44 are used by them, such as FMS Y occupying a subband 47 of 1.0 mHz, the mobile communications system in accordance with the invention would also be aware of these unavailable subbands. The system would also be aware that certain subbands 48 are available. In this case, 17 mHz of non-contiguous frequency space is available.

Figure 5:
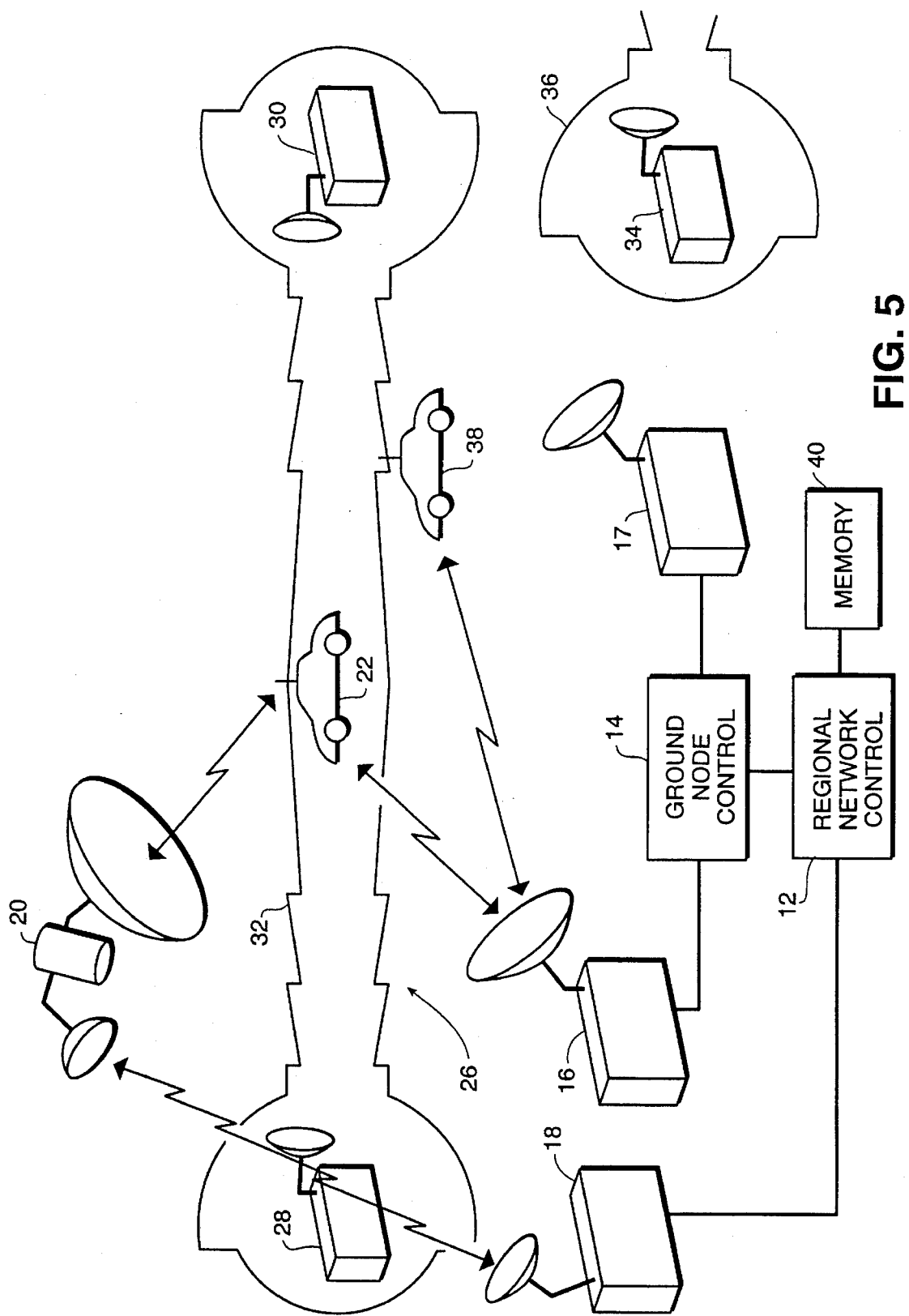
FIG. 5 presents part of the system of FIG. 1 showing the interference zones of a fixed microwave service having priority over the use of a common frequency band and two mobile users, one in an interference zone and one outside the interference zones.

Referring now to FIG. 5, there is shown part of the system of FIG. 1. In particular, there are shown a space node 20, two ground nodes 16 and 17, a ground node control center 14, a space node control center 18, and a regional network control center 12. Additionally there is shown a preexisting communication system that, in this case, is a fixed microwave service 26 operating in the 1–3 gHz frequency band. This preexisting system is licensed and fixed in position using stationary microwave antennas 28, 30 for transmission and reception. Such a system may have a license to operate for many years in the future while at the same time, regulatory agencies may permit operation in the same frequency spectrum on a not-to-interfere and not-to-claim interference basis. Each of the antennas shown 28, 30 has an antenna pattern that together with the pattern of the other antenna forms the three dimensional interference zones indicated by numeral 32 in FIG. 1. A third antenna 34 is shown residing within its own respective interference zone 36. As described, interference zones can be dynamic in size dependent on power levels used and other considerations, and the transmit and receive interference zones may differ. However, for purposes of clarity in the illustration, the dynamic characteristic of the interference zone 32 is not particularly pointed out and only an outline of the zone is presented. Additionally, multiple fixed microwave services may exist in the same area and may result in overlapping interference zones. Such a possibility is not shown in the drawings so that clarity can be maintained; however, the principles discussed herein apply equally to overlapping interference zones.

Fixed microwave stations are required by the conditions of their operating licenses to use transmitting and receiving antennas meeting certain prescribed minimum antenna directivity standards. In general, the antennas of these fixed stations have relatively narrow beam widths. Knowledge of the known location, transmit power level, frequency, antenna gain pattern, modulation type, RF spectra, and receiver interference sensitivities as well as conservative assumptions as to the ground wave loss, serve to define interference zones around each FMS transmitter and receiver, an example of which is shown in FIG. 5 and indicated by numeral 32. Calculation of the interference zones can be performed by means well known to those skilled in the art. One resource in doing so is the Telecommunications Systems Bulletin (TSB) - 10E available from The Telecommunications Industry Association, Washington, D.C. One source for a data base of microwave frequency subband assignments and locations is the Enhanced Microwave Environment Link File (EMELF) available from the FCC. These interference zones can be determined for each FMS 26 and can be entered into a computer data base such as one that resides in a memory 40 connected to the regional network control center 12. This dam base can be accessed from the memory 40 as is described below to assist in providing frequency subband assignments to mobile users to operate on a not-to-interfere basis. It should be noted that the data base can also be stored in a memory at another location, such as at a node control center or in the user's handset communication device itself, depending on which system embodiment is used.

Two mobile users are shown in FIG. 5. The first 22 is within the interference zone 32 of the FMS 26. The second mobile user 38 is just outside the interference zone 32. The ground node 16 and space node 20 can communicate with both mobile users while the ground node 17 does not communicate with either. The interference zone 32 shown in FIG. 5 is three dimensional in nature and although somewhat difficult to depict in the drawing, respective communications between the space node 20 with the second mobile user 38 and the ground node 16 with the second mobile user 38 would be outside the interference zone 32.

In accordance with the principles of the invention, the communication system would provide communications with both mobile users 22 and 38 of FIG. 5. Because the first mobile user 22 of FIG. 5 is in the interference zone 32 of the FMS 26, it will be assigned a communication frequency subband other than that used by the fixed microwave service 26. Because the second mobile user 38 is outside the interference zone 32 of the FMS 26 and all other interference zones in the area, the node or nodes it communicates with may permit it to use the subbands used by the FMS 26 in its respective interference zone 32.

In the case of the hybrid system, the regional network controller 12 allocates resources and frequency subbands for communication with the mobile users. The subbands assigned for mobile user communications typically include one subband for the forward direction from a system node to the mobile user and one subband for the return direction to the system node from the mobile user. Communication traffic with any particular mobile user can be established with a single pair (forward and return) of such subbands. In an interference zone of an FMS operating in an allocated frequency band, some subbands in that allocated frequency band may not be used by the incumbent FMS thereby making them available for mobile user communications service. However, the subbands available from FMS to FMS typically differ. One of the functions of the regional network control center 12 is to establish and dynamically control the assignment of such subbands to mobile users in such a way as to avoid interference to or from the incumbent fixed microwave service.. It is also a function of the regional network control center 12 in this embodiment to know the position of the user, the power levels of the FMS and of the user, to adjust the boundaries of the interference zone based on those power levels and on other factors as appropriate, and to assign non-interfering frequency subbands to the mobile user based on the above considerations.

An appropriate frequency command is sent to the mobile user via a low rate command link in one embodiment that may be embedded into the digital traffic data stream, to direct that mobile user to a clear frequency subband. Thus, for a mobile user who has logged into and is currently being monitored by the system, continuous communication can be maintained with that user as long as there are one or more subbands in each direction clear of interference with an FMS at the location of that user.

An essential function of the mobile communications system 10 is to be able to initiate calls either to or from a mobile user without interference to or from an FMS prior to the mobile user's initial log on even though that user's position may not yet be known. While this is less of a risk in the case where the fixed position node is calling the mobile user, there is a higher risk when the mobile user desires to make a call. In the case where the mobile user does not know if he or she is in an interference zone and what subbands comprise that zone, the user may select an interfering subband for the initial transmission and violate the "not-to-interfere" rule for coexistence discussed above. For this purpose, one or more clear subbands in each direction (forward and return communications) are provided for call initialization and control (supervision) as is discussed below in more detail.

A "forward" call from the system to a mobile user is initiated by a "call" message on one or more of the designated "forward calling" channels, sent from a system node (satellite or ground), and addressed to the unique ID of the particular mobile user. The number and frequencies of such "forward calling" subbands are such as to insure that none of the subbands used by a node interfere with an FMS anywhere within the coverage area of the node, and that one or more such subbands are receivable by the mobile user without interference by the FMS anywhere within the intended coverage region of that node. Thus, although the system may not yet know the exact position of a mobile user, one or more of the forward calling subbands will be clear of interference wherever the mobile user is within the coverage of a given node. This is the case in all nodes that may be utilized to initiate a call to a mobile user having an unknown position, although the subbands used by the different nodes may differ.

For the "return" call; i.e., for initiation of calls or initial answers by the mobile user, it is also necessary that at least one subband be cleared of interference with vulnerable FMS over the coverage region. In one embodiment, this subband identification is broadcast to the mobile user and is the subband on which the mobile user's call is placed, or first answered by he or she.

Following the initial contacts established as described above, the mobile user may be directed to shift transmit and/or receive subbands based upon the knowledge of its position. For a long duration call, the mobile user may transition through one or more interference zones, in which his or her frequencies are similarly managed by the regional network control center 12 through the respective node control centers in a manner transparent to the mobile user.

Figure 6:
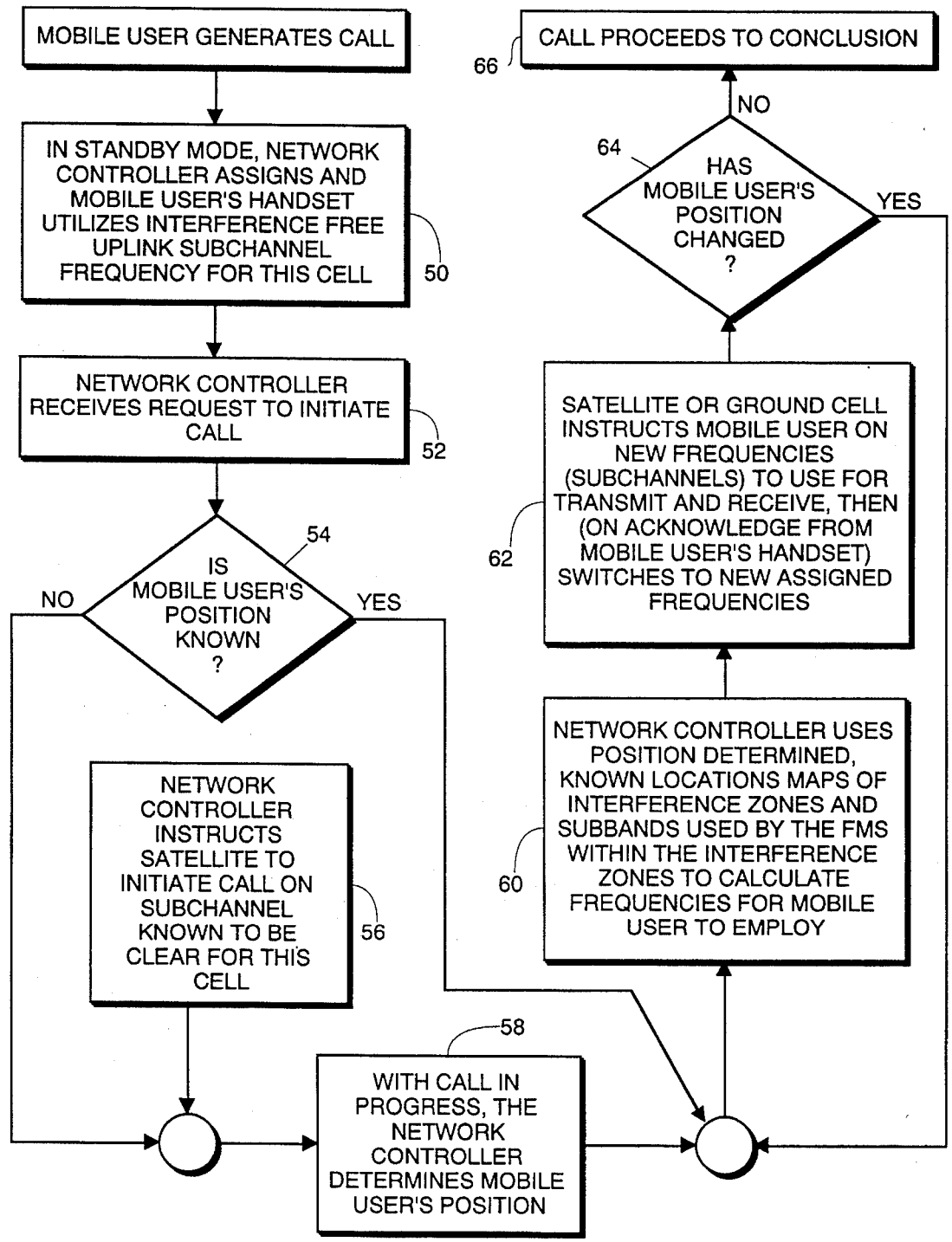
FIG. 6 is a flow chart of the operation of the coexisting mobile communications system when the mobile unit initiates a call.

In the case where the mobile user initiates the call, the steps of the process are as shown in FIG. 6. A brief explanation of FIG. 6 is as follows. Before the call can be initiated by the mobile user, his or her unit has been placed (or will be when it is turned on to make the call) in standby mode 50. In this mode the mobile user's handset has been receiving signals from the satellite or ground node that tell it which frequency is clear of interference to the local FMS or services and therefore should be used for transmission. When the regional network controller 12 receives a request from the mobile user via a satellite or ground node to initiate a call 52, it immediately checks its active files to determine if this mobile user's position is currently known 54. The mobile user's position could be known for several reasons:

1. The mobile user could be on a call at the time (call forwarding or conferencing in a new party to an existing call). If so, his position could be determined by means known to those skilled in the art; for example, as described in U.S. Pat. No. 5,073,900 (Mallinckrodt) incorporated herein by reference.

2. The mobile user above has just completed a call and there has not been sufficient time for him or her to have changed his position significantly (many calls are initiated within seconds of the termination of the previous call).

3. Specialized hardware is available at the mobile user's location which allows him to know and to notify the regional network control center 12 of his exact position. (Such equipment might be a GPS receiver or similar equipment in the user's vehicle or available at the user's location that is used in another system but which makes its output available to be used by the mobile user's handset).

If the mobile user's position is known then the regional network control center 12 calculates the correct non-interference frequency subbands for the mobile user and the space node or ground node as the case may be 56. If the mobile user's position is not known then the call request is received by the network controller via the satellite or ground node and the return transmission to the mobile user is made via the subband known to be clear of interference for all of that particular satellite cell or ground node cell.

With the call now in progress, the mobile user's exact location is determined by the network controller using the receptions from two or more satellites 58 or ground nodes as described in U.S. Pat. No. 5,073,900 (Mallinckrodt) or by other means.

In one embodiment, the network controller now uses the determined user's position combined with the stored data base of interference zone maps from the known locations of all the fixed microwave service installations to calculate 60 which frequency subbands are available on a mutual non-interference basis for both the uplink and the downlink for this mobile user 60. Final selection of commanded frequencies to the satellite (or ground) transmitter and the mobile user's transmitter will also take into consideration existing traffic loads on each subband and other current network usage parameters.

The space or ground node as the case may be will then transmit to the mobile user's handset, on the control subband without disrupting the mobile user's call, the required transmit and receive frequency subbands. Both the satellite (or ground station) and the mobile user's handset transparently change to the newly assigned subbands 62. As the call proceeds, the network controller continuously monitors the position of the user. As his or her position changes, steps 60 and 62 will be repeated and utilize the known maps of interference zones from the fixed microwave service installations and the mobile user's position to assign appropriate new transmit and receive subbands. These steps are repeated as necessary 64. If the mobile user's position does not change the call proceeds to its conclusion 66.

Figure 7:
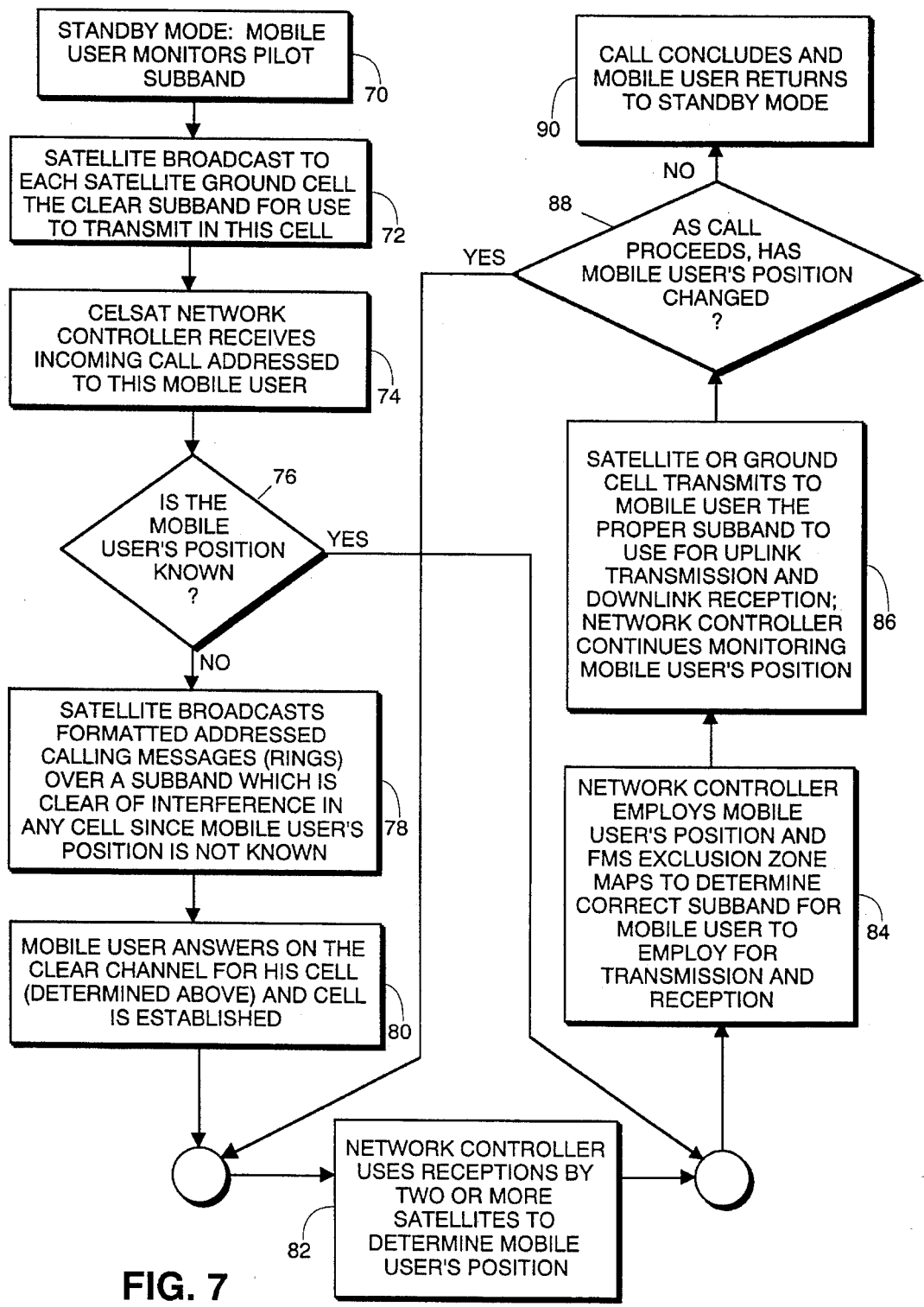
FIG. 7 is a flow chart of the operation of the coexisting mobile communications system when a mobile user receives a node-initiated call.

Referring now to FIG. 7, the case is presented in which a forward call is initiated by a node to a mobile user. Before the call can be initiated by the node to the mobile user, the user's unit is in standby mode 70. In this mode the mobile user's handset has been receiving signals from the satellite or ground node that tell it which subbands are clear of interference to the local fixed microwave service 72.

When the network controller 12 receives a request 74 for a call to the mobile user, it immediately checks its active files to determine if this mobile user's position is currently known 76. As discussed above, the mobile user's position could be known for several reasons.

If the mobile user's position is not known, the network control center commands the node to communicate over a clear forward call subband 78. The mobile user answers on the clear subband 80. The network controller then uses reception of the mobile user's answer by two or more nodes to determine the user's position 82, as is discussed below in more detail.

When the mobile user's position becomes known, the network controller now uses that known position combined with the stored dam base of interference zone maps for the fixed microwave service installations to calculate which subbands are available on a mutual non-interference basis for both the uplink and the downlink for this mobile user 84. As discussed above, final selection of commanded frequencies to the satellite (or ground) transmitter and the mobile user's transmitter will also take into consideration existing traffic loads on each subband and other current network usage parameters.

The space or ground node as the case may be will then transmit to the mobile user's handset, on the control subband without disrupting the mobile user's call, the required transmit and receive frequency subbands 86. Both the satellite (or ground station) and the mobile user's handset transparently change to the newly assigned frequencies. As the call proceeds, the network controller continuously monitors the position of the user 88. As his position changes, steps 84 and 86 will be repeated and utilize the known maps of interference zones from the fixed microwave service installations and the mobile user's position to assign appropriate new transmit and receive subbands. These steps are repeated as necessary 88. If the mobile user's position does not change the call proceeds to its conclusion 90.

Accurate position determination can be obtained through two-dimensional multi-lateration. Each mobile user unit's transmitted spreading code is synchronized to the epoch of reception of the pilot signal from its current control site, whether ground or satellite node. The normal mode of operation will be two dimensional, i.e., based upon two receptions, at ground or space nodes of the user response code. In conjunction with a priori information inherent in a topographic data base, e.g., altitude of the surface of the earth, position accuracy to within a fraction of a kilometer can be provided, which is more than adequate for the avoidance protocol. Other means are available for position location, such as GPS.

In normal operation, with two or more satellite and/or ground sites receiving the transmission from each mobile user, its position is known accurately enough to determine which, if any, individual site interference zone it is in and the interference zones would be managed on a per site basis. Note that both up and down link interference zones are determined by the position of the mobile user irrespective of the satellite or the ground node.

Other means for determining the position of a mobile user relative to a multiplicity of known system nodes, either fixed on the ground or at known positions in space, are known to those skilled in the art. In a code division multiple access system (CDMA), any of these means are largely incidental to the function of transmitting and/or receiving the CDMA signal at multiple sites. The receiving function requires synchronization of the epoch of a local spread code generator to that of the received spread code, so that having achieved code synchronization, one inherently has a measure of the delay time and hence the range of the signal. Various references describe how this information can be used in several different geometrical configurations to provide the delay measurements necessary to provide hyperbolic, elliptical, spherical or hybrid multi-lateration position determination. By any of these means the mobile position can either be determined by the network controller or by the mobile user and relayed to the network controller.

Figure 8:
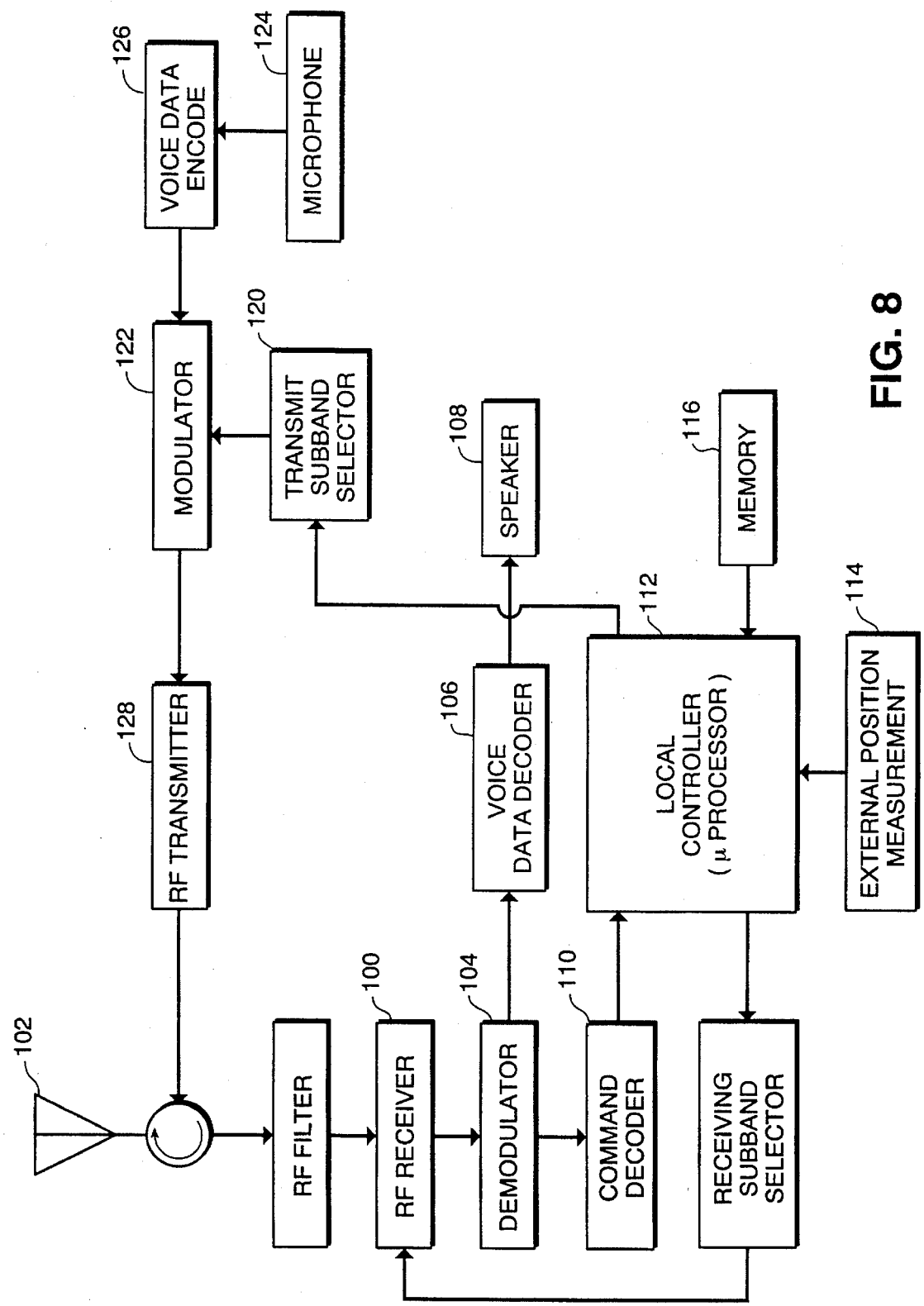
FIG. 8 presents a generalized block diagram of a mobile transceiver for operating in the system of FIGS. 1 and 5.

The frequency assignment system and method described above will also function with existing time division multiple access (TDMA) and analog mobile telephone systems. FIG. 8 shows a block diagram of the hand held mobile user's handset for this more general case. In that embodiment, an RF receiver 100 is connected to the antenna 102 and provides its down-converted signal to a demodulator 104. The demodulator separates voice signals that are provided to a voice data decoder 106 (not required for an analog system) and then to a speaker 108. The demodulator 104 also demodulates the command signals and provides them to a command decoder 110. The command decoder provides the commands to the microprocessor 112. The microprocessor 112 receives the command signals and the external position measurement signal 114, accesses the memory 116 and controls the transmit channel selector accordingly 120. The transmit channel selector controls the modulator 122 which receives the voice of the user through a microphone 124 and a voice encoder 126. The modulated signal is provided to the RF transmitter 128 for transmission through the antenna 102.

Figure 9:
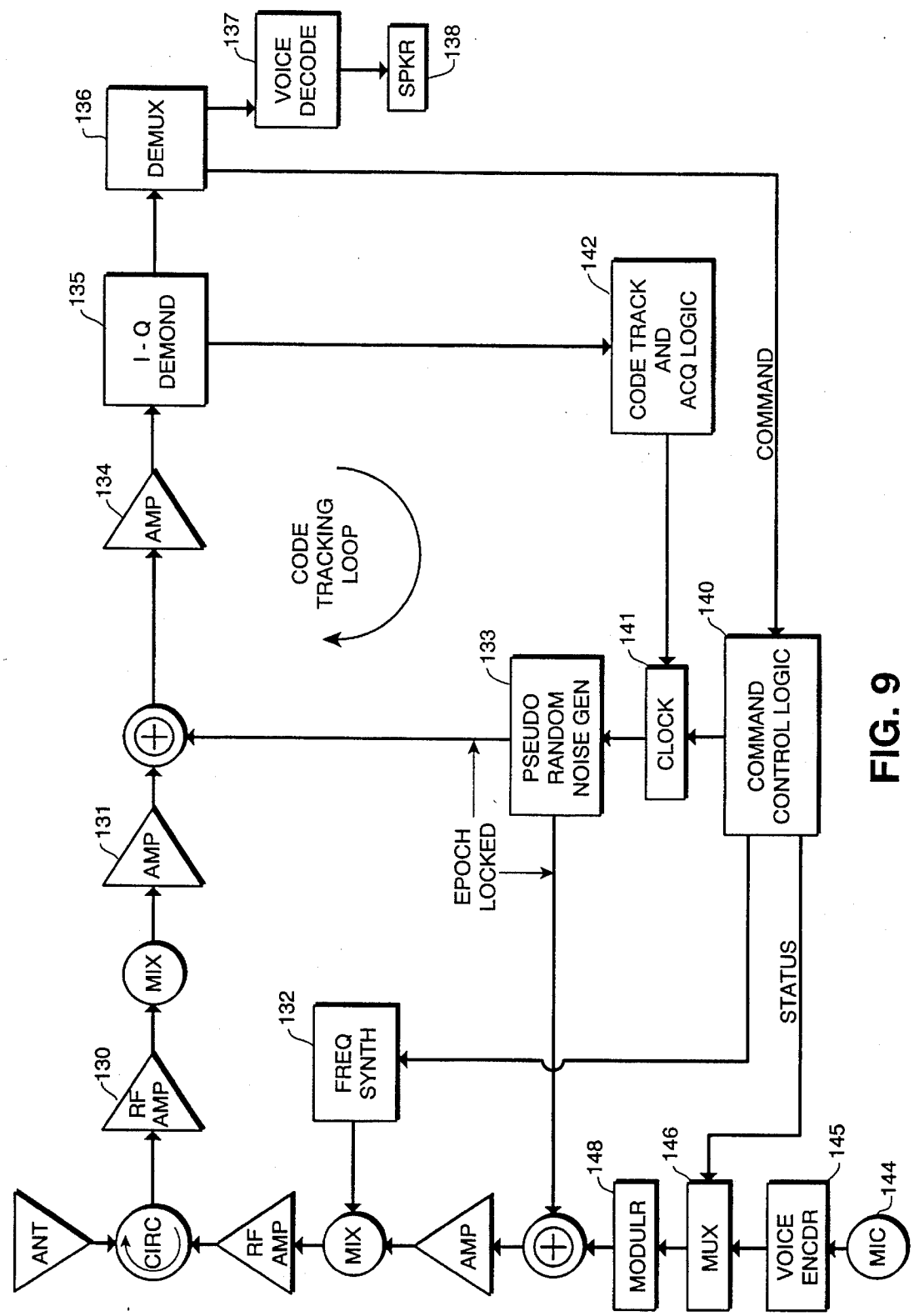
FIGS. 9 and 10 present block diagrams of a mobile transceiver incorporating CDMA for operating in the system of FIGS. 1 and 5.

FIG. 9 is an alternate diagram of a user unit, this time illustrating the method in which a CDMA receiver synchronizes its internally generated pseudo-random noise code to the received signal by means of a code tracking loop and hence provides the epoch needed to compute the range measurement. This technique is well known to those skilled in the art.

An RF amplifier 130 amplifies the incoming signal before it is mixed with the signal from the frequency synthesizer 132. The resulting signal is amplified again 131, combined with the pseudo-random noise signal from the generator 133, amplified 134 and applied to the I-Q demodulator 135. The down-converted signal is demultiplexed 136, and part is provided to the voice decoder 137 and the speaker 138 for audio. Another part of the demultiplexed signal is command data and is provided to the command control logic 140. The command control logic 140 controls the frequency synthesizer 132, and is connected through the clock 141 to the pseudo-random noise generator 133. The I-Q demodulator 135 also provides signals to the code tracking and acquisition logic circuitry 142 that in turn is connected to the clock 141. As can be seen by reference to FIG. 9, a code tracking loop 143 is provided.

The mobile user speaks into the microphone 144, the audio signals are encoded 145, multiplexed 146 with command control logic signals 140 and provided to a modulator 148. The modulated signal is combined with the pseudo-random noise signals 133, amplified, and mixed with signals from the frequency synthesizer 132. The up-converted signal is amplified again and provided through the circulator to the antenna.

Figure 10:
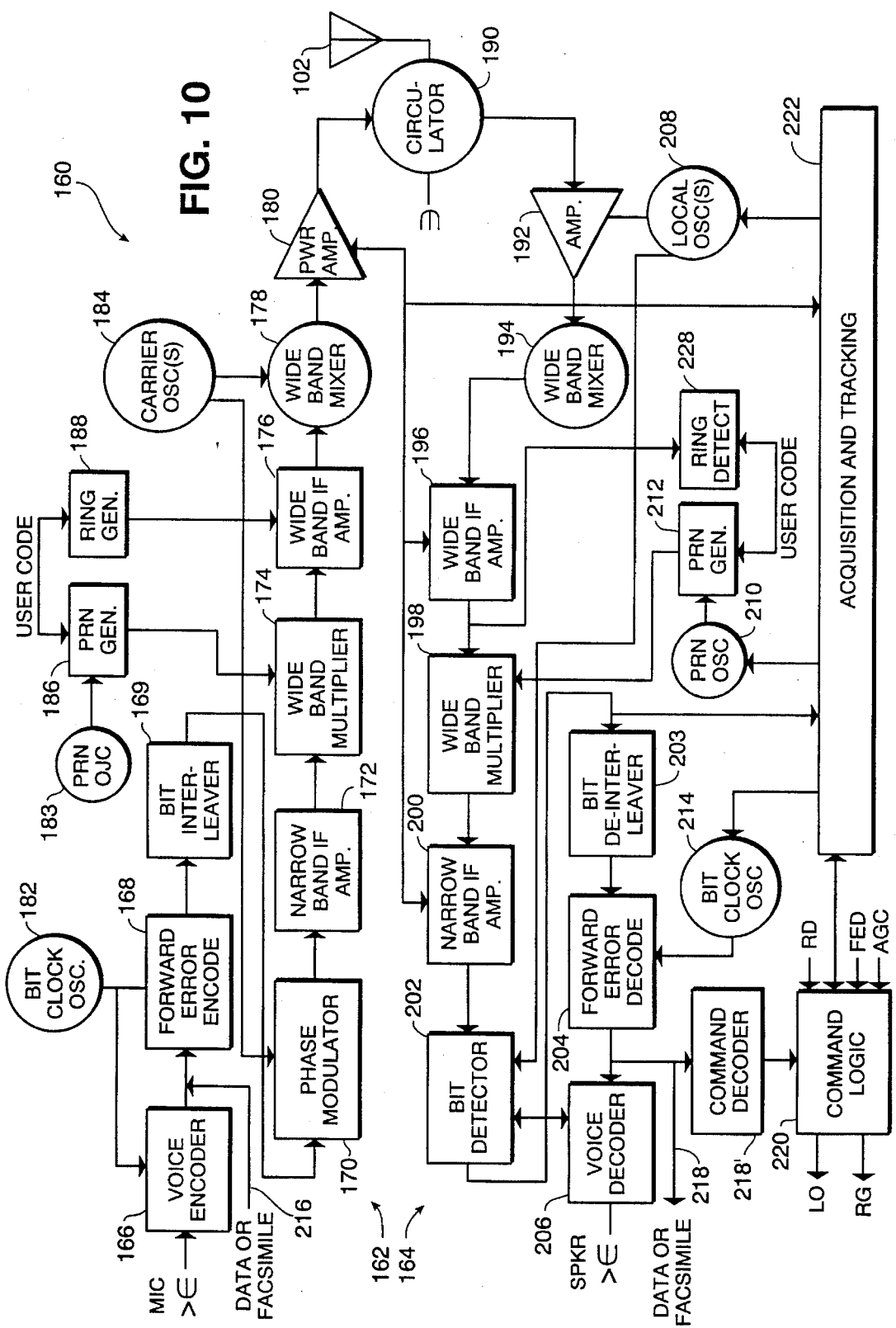

The user unit 160 shown in FIG. 10 is a more detailed embodiment of a CDMA transceiver comprising a transmitter section 162 and a receiver section 164. For the transmission of voice communication, a microphone couples the voice signal to a voice encoder 166 which performs analog to digital encoding using one of the various modern speech coding technologies well known to those skilled in the art. The resulting digital bit stream proceeds sequentially through forward error encoder 168, bit interleaver 169, phase modulator 170, narrow band IF amplifier 172, wideband multiplier or spreader 174, wide band IF amplifier 176, wide band mixer 178, and final power amplifier 180. Oscillators or equivalent synthesizers derive the bit frequency 182, pseudo-random noise or "chip" frequency 183, and carrier frequency 184. The PRN generator 186 comprises deterministic logic generating a pseudo-random digital bit stream capable of being replicated at the remote receiver. The ring generator 188 generates a short pseudo-random sequence.

The transceiver receive function 164 demodulation operations mirror the corresponding transmit modulation functions in the transmitter section 162. The signal is received by the non-directional antenna 102 and conducted to the circulator 190. An amplifier 192 amplifies the received signal for mixing to an IF at mixer 194. The IF signal is amplified 196 and multiplied or despread 198 and then IF amplified 200 again. The IF signal then is conducted to a bit detector 202 which decides the polarity of each channel bit, a bit de-interleaver 203 and then to a forward error decoder 204. Finally a voice decoder 206 performs digital to analog converting and results in a voice signal for communication to the user by a speaker or other means. Local oscillator 208 provides the first mixer 194 LO and the bit detector 202 timing. A PRN oscillator 210 and PRN generator 212 provide the deterministic logic of the spread signal for despreading purposes. The bit clock oscillator 214 drives the bit in the bit detector 202, forward error decoder 204 and the voice decoder 206.

The bit interleaver 169 and de-interleaver 203 provide a type of coded time diversity reception which provides an effective power gain against multipath fading to be expected for mobile users. Its function is to spread or diffuse the effect of short bursts of channel bit errors so that they can more readily be corrected by the error correction code.

As an alternative mode of operation, provision is made for direct data or facsimile input 216 to the transmitter chain and output 218 from the receiver chain. This direct data input and output feature may be used for facsimile communication for example.

A command decoder 218 and command logic element 220 are coupled to the forward error decoder 204 for receiving commands or information. By means of special coding techniques known to those skilled in the art, the non-voice signal output at the forward error decoder 204 may be ignored by the voice decoder 206 but used by the command decoder 218.

As shown, acquisition, control and tracking circuitry 222 are provided in the receiver section 164 for the three functional oscillators 208, 210, 214 to acquire and track the phase of their counterpart oscillators in the received signal. Means for so doing are well known to those skilled in the art.

Automatic gain control 224 is provided on the receive side 164, and the control signal is additionally utilized to provide open loop transmitter output power level control 226 of the transmit power amplifier 180. By virtue of reciprocity of the outbound and inbound paths, introducing the same attenuation control in the transmitter insures that all user signals arrive at the node (satellite or ground) at approximately equal amplitude in order that nearby users do not create an intolerably strong in-band interference signal and thereby preclude receiving weaker, more distant users.

An arrangement is provided for generating call requests and detecting ring signals. A ring generator 188 generates a ring signal based on the user's code for calling out with the user unit 160. For receiving a call, the ring signal is detected in a fixed matched filter 228 matched to a short pulse sequence which carries the user's unique code. By this means each user can be selectively called. As an option, the ring detect and call request signals may be utilized in poll/response mode to provide tracking information on each active user. Course tracking information, adequate for management of the call routing functions is provided by comparison of signal quality as received at various modes. For the precision location option, the user response signal time is accurately locked to the time of receipt of the polling signal, to a fraction of a PRN chip width. Measurement of the round trip poll/response time from two or more nodes or time differences of arrival at several nodes provides the basic measurement that enable solution and provision of precise user position. Ground and satellite transmitters and receivers duplicate the functions summarized above for the user units.

The command logic 220 is further coupled to the receiver AGC 224, the matched filter ring detector (RD) 228, the acquisition and tracking circuitry 222, the transmit local oscillator (LO) 208 and the ring generator (RG) 188 to command various modes of operation.

As discussed above, the position signal indicative of the user's present position may alternatively come from a local GPS or other source. Additionally, the user's handset may include memory storing a part of or the whole continental United States ("CONUS") map of FMS data in one or more chips or other memory devices. For example a CD ROM arrangement may be used. Calculations may be performed in the user's handset in the background. The user unit may thus be able to determine the position of the mobile user itself and based on the position and the contents of the FMS data base, select the appropriate noninterfering transmit and receive subbands.

While the invention has been shown embodied in a system coexisting with fixed microwave service (FMS), it should be understood that the invention may have other applicability as well. The principles of the invention may be applied to systems and methods for providing communications with mobile units in coexistence with other communications services or systems. While several particular forms of the invention have been illustrated and described, it will be apparent that various modifications can be made without departing from the spirit and scope of the invention. Accordingly, it is not intended that the invention be limited, except by the appended claims.

I claim:

1. A communications system for providing communications with a mobile user in a frequency band and in the geographic vicinity of a different communications service that operates in at least one sub-band that uses some but not all of the frequency band, while avoiding mutual interference between the mobile user and the different communications service, the communications system comprising:

a mobile communication device used by the mobile user, the communication device being responsive to a frequency control signal to select the frequency sub-band in which it operates; and a control center for communicating the frequency control signal to the mobile communication device, the control center comprising:

a memory in which is stored a geographic and frequency description of the different communications service thereby defining an interference zone for the different communications service;

a position locating system adapted to determine the position of the mobile user and provide a position signal; and a processor adapted to receive the position signal and access the memory to retrieve the description of the interference zone of the different communications service, the processor further operative to compare the position of the mobile user to the interference zone and if the user is determined to be within the interference zone, provide a frequency control signal to the mobile communication device to select a frequency sub-band in the frequency band other than the frequency sub-band or sub-bands used by the different communications service.

2. The communications system of claim 1 wherein the mobile communication device comprises the position locating system.

3. The communications system of claim 1 wherein the mobile communication device comprises the memory and the processor.

4. The communications system of claim 3 wherein the mobile communication device further comprises the position locating system.

5. The communications system of claim 1 wherein the mobile communication device is adapted to delay transmission by the mobile communication device until the processor has determined the position of the user and if the user's position is determined to be within the interference zone, to delay transmission until the processor has provided the frequency control signal to select a frequency sub-band other than the frequency sub-band or sub-bands used by the different communications service.

6. The communications system of claim 1 further comprising a first communication node adapted to provide communication with the mobile communication device, the node providing the frequency control signal from the processor to the communication device of the mobile user.

7. The communications system of claim 6 wherein the first communication node comprises a surface node and the communications system comprising at least one additional surface node, each of which is adapted to communicate with the mobile communication device and a surface node control center, wherein the surface node control center comprises the position locating system, the processor, and the memory, the surface node control center communicating the frequency control signal from the processor to the mobile communication device through a surface node.

8. The communications system of claim 6 wherein the first communication node comprises a space node and the communications system comprising at least one additional space node, each of which is adapted to communicate with the mobile communication device, and a space node control center, wherein the space node control center comprises the position locating system, the processor, and the memory, the space node control center communicating the frequency control signal from the processor to the mobile communication device through a space node.

9. The communications system of claim 6 further comprising a plurality of surface nodes and space nodes, each node adapted to communicate with the mobile communication device, and a control center, wherein the control center comprises the position locating system, the processor, and the memory, the control center communicating the frequency control signal from the processor to the mobile communication device through a node.

10. The communications system of claim 9 further comprising a surface node control center in communication with each of the surface nodes, a space node control center in communication with each of the space nodes and wherein the surface node control center and space node control center are connected to a network control center that comprises the position locating system, the processor, and the memory, the network control center communicating the frequency control signal from the processor to the mobile communication device through a node control center and a node.

11. The communications system of claim 10 wherein the position locating system determines the geographic location of the mobile user through multilateration with a plurality of nodes.

12. The communications system of claim 1 further comprising:

at least one space node having a multiple beam antenna positioned so to establish a first set of cells, each space node being capable of transmitting and receiving different predetermined sets of code division multiple access coded, spread spectrum waveforms;

at least one surface node positioned so to establish a second set of cells, each surface node being capable of transmitting and receiving the predetermined sets of code division multiple access coded, spread spectrum waveforms; and a network controller operationally connected with each space node and with each surface node to selectively allocate communications with the mobile user among the surface and space nodes and select the subband of operation of the mobile user based on the frequency control signal.

13. The communications system of claim 1 wherein:

the memory stores geographic and frequency descriptions of a plurality of different communications services thereby defining an interference zone for each of the different communications services;

the processor is also adapted to access the memory to retrieve the descriptions of the interference zones of the different communications services, compare the position of the mobile user to the interference zones and if the user is determined to be within an interference zone, provide a frequency control signal to the mobile communication device to select a frequency sub-band in the frequency band other than the frequency sub-band or sub-bands used by the communications service of the interference zone in which the mobile user is located.

14. A communications system for providing communications with a mobile user in the frequency bands and in the geographic vicinities of different communications services having fixed positions and that operate in sub-bands that use some but not all of the frequency band as the mobile user, while avoiding mutual interference between the mobile user and the different communications services, the communications system comprising:

a mobile communication device used by the mobile user, the communication device being responsive to a frequency control signal to select the frequency sub-band in which it operates;

a plurality of surface nodes adapted to communicate with the mobile communication device;

a memory in which is stored geographic and frequency descriptions of the different communications services thereby defining an interference zone for each of the different communications services;

a position locating system adapted to determine the position of the mobile user and provide a position signal;

a processor adapted to receive the position signal, access the memory to retrieve the descriptions of the interference zones of the communications services, compare the position of the mobile user to the interference zone descriptions and if the user is determined to be within an interference zone, provide a frequency control signal to the mobile communication device to select a frequency sub-band in the frequency band other than the frequency sub-band or sub-bands of the communications service of the interference zone in which the mobile user is located; and a surface node control center, wherein the surface node control center comprises the position locating system, the processor, and the memory, the surface node control center communicating the frequency control signal from the processor to the mobile communication device through a surface node.

15. A communications system for providing communications with a mobile user in the frequency bands and in the geographic vicinities of different communications services having fixed positions and that operate in sub-bands that use some but not all of the frequency band as the mobile user, while avoiding mutual interference between the mobile user and the different communications services, the communications system comprising:

a mobile communication device used by the mobile user, the communication device being responsive to a frequency control signal to select the frequency sub-band in which it operates;

a plurality of space nodes adapted to communicate with the mobile communication device;

a memory in which is stored geographic and frequency descriptions of the different communications services thereby defining an interference zone for each of the different communications services;

a position locating system adapted to determine the position of the mobile user and provide a position signal;

a processor adapted to receive the position signal, access the memory to retrieve the descriptions of the interference zones of the communications services, compare the position of the mobile user to the interference zone descriptions and if the user is determined to be within an interference zone, provide a frequency control signal to the mobile communication device to select a frequency sub-band in the frequency band other than the frequency sub-band or sub-bands of the communications service of the interference zone in which the mobile user is located; and a space node control center, wherein the space node control center comprises the position locating system, the processor, and the memory, the space node control center communicating the frequency control signal from the processor to the mobile communication device through a space node.

16. A method for communicating with a mobile user having a communications device in a frequency band and in the geographic vicinity of a different communications service that operates in at least one sub-band that uses some but not all of the frequency band, while avoiding mutual interference between the mobile user and the different communications service, the method comprising the steps of:

storing in a memory a geographic and frequency description of the different communications service thereby defining an interference zone for the different communications service;

determining the position of the mobile user;

accessing the memory to retrieve the description of the different communications service; and comparing the position of the mobile user to the interference zone of the different communications service and if the user is determined to be within the interference zone, providing a frequency control signal to the mobile communication device to select a sub-band in the frequency band other than the frequency sub-band or sub-bands of the communications service.

17. The method of claim 16 wherein the step of determining the position of the mobile user comprises the step of determining the mobile user's position by a position location device located at the mobile communications device.

18. The method of claim 16 wherein the steps of storing a description of the interference zone, accessing the memory to retrieve the description of the interference zone of the communications service, and comparing the position of the mobile user to the interference zone are performed at the mobile communications device.

19. The method of claim 18 wherein the step of determining the position of the mobile user comprises the step of determining the mobile user's position by a position location device located at the mobile communications device, the position location device being coupled to the mobile communication device.

20. The method of claim 16 further comprising the step of:

delaying transmissions of the mobile communication device until after determining the position of the user and if the user's position is determined to be within the interference zone, delaying the user's transmission until the frequency control signal has been provided to select a sub-band other than the sub-band or sub-bands of the different communications service.

21. The method of claim 16 further comprising the step of:

configuring a first communication node to perform the step of communicating with the mobile communication device; and providing the frequency control signal to the communication device of the mobile user from the first communication node.

22. The method of claim 21 further comprising the steps of:

configuring a plurality of geographically separated surface nodes to communicate with the mobile communication device;

configuring a surface node control center for performing the steps of:
  coordinating communications with the mobile user through the surface nodes;
  determining the position of the mobile user;
  storing a description of the interference zone;
  accessing the memory to retrieve the description of the interference zone of the different communications service; and
  comparing the position of the mobile user to the interference zone and providing the frequency control signal through a node.

23. The method of claim 21 further comprising the steps of:

configuring a plurality of geographically separated space nodes to communicate with the mobile communication device;

configuring a space node control center for performing the steps of:
  coordinating communications with the mobile user through the space nodes;
  determining the position of the mobile user;
  storing a description of the interference zone;
  accessing the memory to retrieve the description of the interference zone of the communications service; and
  comparing the position of the mobile user to the interference zone and providing the frequency control signal through a node.

24. The method of claim 21 further comprising the steps of:

configuring a plurality of geographically separated surface nodes and space nodes to communicate with the mobile communication device;

configuring a control center for performing the steps of:
  coordinating communications with the mobile user through the nodes;

determining the position of the mobile user;

storing a description of the interference zone of the different communications service;

accessing the memory to retrieve the description of the interference zone of the different communications service; and comparing the position of the mobile user to the interference zone and providing the frequency control signal through a node.

25. The method of claim 24 further comprising the steps of:

coupling each of the surface nodes to a surface node control center;

coupling each of the space nodes to a space node control center;

wherein the step of configuring a control center comprises the step of configuring the control center as a network control center to perform the steps of:

coordinating communications with the mobile user through the nodes;

determining the position of the mobile user;

storing a description of the interference zone;

accessing the memory to retrieve the description of the interference zone of the different communications service; and comparing the position of the mobile user to the interference zone and providing the frequency control signal through a node.

26. The method of claim 25 wherein the step of determining the user's position comprises the step of determining the geographic location of the mobile user through multilateration using a plurality of nodes.

* * * * *